(12) United States Patent
Lohnecker

(10) Patent No.: US 10,981,313 B2
(45) Date of Patent: Apr. 20, 2021

(54) CLOSING UNIT FOR A SHAPING MACHINE

(71) Applicant: ENGEL AUSTRIA GmbH, Schwertberg (AT)

(72) Inventor: Anton Lohnecker, Ertl (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 0 days.

(21) Appl. No.: 16/676,904

(22) Filed: Nov. 7, 2019

(65) Prior Publication Data

US 2020/0147848 A1 May 14, 2020

(30) Foreign Application Priority Data

Nov. 14, 2018 (AT) .............................. A 50996/2018

(51) Int. Cl.
*B29C 45/67* (2006.01)
*B29C 45/82* (2006.01)

(52) U.S. Cl.
CPC .......... *B29C 45/67* (2013.01); *B29C 45/6728* (2013.01); *B29C 45/82* (2013.01); *B29C 2045/6757* (2013.01); *B29C 2045/824* (2013.01)

(58) Field of Classification Search
CPC ..... B29C 45/67; B29C 45/6728; B29C 45/68; B29C 45/76; B29C 45/82; B29C 2045/6757; B29C 2045/824
See application file for complete search history.

(56) References Cited

U.S. PATENT DOCUMENTS

| 4,208,879 A * | 6/1980 | Segawa .................. B22D 17/32 164/314 |
| 5,188,850 A | 2/1993 | Hirata et al. |
| 5,192,557 A | 3/1993 | Hirata et al. |
| 5,277,568 A | 1/1994 | Hirata et al. |
| 5,320,517 A | 6/1994 | Hirata et al. |
| 9,452,559 B2 * | 9/2016 | Zeidlhofer .............. B29C 45/84 |
| 2012/0248654 A1 * | 10/2012 | Van Eerde .......... B29C 45/5008 264/328.19 |
| 2018/0229414 A1 * | 8/2018 | Schultz ................... B29C 45/82 |

FOREIGN PATENT DOCUMENTS

| DE | 101 54 465 | 5/2003 |
| DE | 10 2007 011 442 | 9/2008 |
| DE | 10 2012 104 251 | 11/2013 |
| DE | 10 2017 111 407 | * 11/2017 |
| EP | 1 321 276 | 12/2002 |
| JP | 2-6114 | 1/1990 |
| JP | 4-84655 | 3/1992 |
| JP | 8-276482 | 10/1996 |
| WO | 2011/075812 | 6/2011 |

* cited by examiner

*Primary Examiner* — James P Mackey
(74) *Attorney, Agent, or Firm* — Wenderoth, Lind & Ponack, L.L.P

(57) ABSTRACT

A closing unit for a shaping machine includes mutually moveable mold mounting plates suitable for carrying mold tool portions, a first hydraulic cylinder adapted to apply a closing force to the mold mounting plates, a second hydraulic cylinder, and a pressure storage device connected to the first hydraulic cylinder and adapted to store a pressure prevailing in the first hydraulic cylinder upon pressure relief at a storage device pressure. A hydraulic interconnection of the pressure storage device with the second hydraulic cylinder allows the storage pressure stored in the pressure storage device to be used for locking and/or unlocking the locking device.

16 Claims, 6 Drawing Sheets

CLOSING UNIT FOR A SHAPING MACHINE

BACKGROUND OF THE INVENTION

The present invention concerns a closing unit for a shaping machine.

Shaping machines can be understood to be injection molding machines, injection presses, presses and the like. Hereinafter, the state of the art is outlined by reference to the example of injection molding machines. Similar problems and corresponding details however also apply in regard to other shaping machines.

Hydraulic closing units of the general kind set forth have at least one first hydraulic cylinder which serves to apply a closing force to mutually moveable mold mounting plates. As a result, tool portions which are to be mounted to the mold mounting plates are pressed against each other. After the closing force has been built up, a shaping process is carried out. For example, a plasticized plastic can be injected into the mold which is subjected to the action of the closing force (injection molding process). Alternatively, for example, a reactive mixture can be introduced into the mold and cured therein.

There are various kinds of structure for common closing units, including for example two-plate closing units having four bars or a central push rod. Three-plate machines with four bars are, however, also known.

As the first hydraulic cylinder in many cases has to generate a considerable force (power stroke), in many cases there is a separate fast stroke in order to be able to move the mold mounting plates relative to each other at a higher speed. That makes it necessary at the same time for the first hydraulic cylinder and/or one of the mold mounting plates to be locked relative to at least one pull or push rod so that, after the fast stroke movement has been performed, the closing force can be built up. At least one locking device can be actuated by at least one second hydraulic cylinder which, for example, moves halves of a split nut relative to each other. In a closed position, an internal profile of the split nut then engages into an external profile on the pull or push rod.

The closing force can be reduced after the shaping process has been carried out so that the closing unit can be opened and the molding can subsequently be removed.

It is known from DE 10 2012 104 251 to load a hydraulic storage device upon pressure relief to reduce the closing force. The energy stored in that way is used in the next shaping cycle for again building up the closing force. By virtue of the high pressures which have to be achieved when applying the closing force in the first hydraulic cylinder, and by virtue of the pressure loss which inevitably occurs upon storage of the energy in the hydraulic storage device, the amount of energy which is actually re-used is however relatively slight in comparison with that which is used for applying the closing force.

DE 10 2007 011 442 A1 discloses a closing unit with a hydraulic power stroke and electrically driven fast stroke. In that case, it is proposed that the energy which is recovered from an electrically driven fast stroke movement is stored hydraulically and used for applying the closing force or for further fast stroke movements. In that respect, there is naturally the disadvantage that the energy involved in applying the closing force is not re-used at all, and further use of the energy from the fast stroke for applying the closing force is quite inefficient.

SUMMARY OF THE INVENTION

The object of the present invention therefore is to provide a closing unit which allows more efficient re-use of the energy employed for applying the hydraulic closing force than is the case in the state of the art.

That object is achieved by a hydraulic interconnection of the pressure storage device with the at least one second hydraulic cylinder, by which interconnection the storage pressure stored in the pressure storage device can be used—for example, for locking and/or unlocking a locking device or for driving a hydraulic core pull member.

In closing units in the state of the art, the hydraulic systems for applying the closing force and for further systems like, for example, the locking device are implemented separately from each other as, in the operation of applying the closing force, pressures which are a multiple higher occur than is the case in the other systems.

The invention is therefore based, inter alia, on the realization that it is possible to accept connecting the hydraulic systems for applying the closing force and the other systems together. The pressure loss which inevitably occurs upon storage of the hydraulic energy from applying the closing force no longer occurs as a disadvantage in the case of the invention because the other systems in any case operate with a lower pressure.

Advantages of the invention are, inter alia, that firstly a large part of the energy which is liberated when reducing the closing force can be recovered and re-used. For example, only relatively low pressures and small amounts of oil are usually necessary for the locking action and, for example, an associated locking and unlocking movement is necessarily performed in the automatic cycle of an injection molding machine or in other shaping machines, at each production/reduction of closing force. Therefore, with a suitable design of accumulator and locking cylinder, secondly, no additional supply for the locking action by a pump would be necessary and also the dynamics of the locking movement would be improved by virtue of a supply by an accumulator, which can be reflected in a saving in terms of cycle time.

In particular, hydraulic oil can be used as the hydraulic fluid.

The second hydraulic cylinder is a hydraulic cylinder which is independent of the closing force actuation (the first hydraulic cylinder).

In addition, a shaping machine has a closing unit according to the invention.

A pull or push rod can be provided for the transmission of the closing force from the first hydraulic cylinder to the mold mounting plates, and a locking device can be provided for locking the pull or push rod relative to one of the mold mounting plates and/or relative to the first hydraulic cylinder.

The locking device can preferably be actuated by the second hydraulic cylinder which moves, for example, halves of a split nut relative to each other. In a closed position, an internal profile of the split nut can then engage into an external profile on the pull or push rod.

The second hydraulic cylinder can also be adapted to drive a hydraulic core pull member.

Preferably, there is exclusively the storage pressure stored in the pressure storage device as the pressure source for the second hydraulic cylinder for unlocking and/or locking. That measure makes it possible to avoid a separate hydraulic system for the locking action, as far as possible. Self-evidently in that respect, it is preferred if the second hydraulic cylinder is the exclusive drive for the locking device. It is possible to provide something similar for a core puller driven by the second hydraulic cylinder.

Particularly preferably, the storage device pressure can be between 10 bars and 100 bars, preferably between 15 bars and 50 bars, and particularly preferably between 20 bars and 40 bars.

At least one pressure intensifier can be connected between the first hydraulic cylinder and the pressure storage device. The storage device pressure and/or a volume of the hydraulic fluid in the pressure storage device can be so adapted in that way that the storage pressure and/or the volume is suitable for the design of the second hydraulic cylinder and/or the locking device. In other words, it is thereby particularly simply and reliably possible in each shaping cycle to store so much hydraulic energy that it is sufficient for unlocking and locking the locking device.

It should be mentioned that the term 'pressure intensifier' is used to denote both devices for producing a pressure intensification and also devices for producing a pressure reduction.

A plurality of stages of different pressure intensification and/or pressure reduction can be provided, wherein preferably there can be a pressure-reduced stage, a direct stage, and a pressure-intensified stage. The adaptation referred to with respect to the stored volume under the stored storage pressure can thereby be matched even more precisely. The term a direct stage is used to denote that there is neither a pressure intensification nor a pressure reduction.

The plurality of stages in respect of pressure intensification and/or pressure reduction can be implemented by a pressure intensifier, the hydraulic circuitry of which can be selected by a switching valve. In that way, it is possible to avoid manufacturing complication (and thereby costs), insofar as fewer pressure intensifiers or only one pressure intensifier have to be used.

Naturally, the various stages can also be implemented by a plurality of different pressure intensifiers.

It is, moreover, also possible for both measures to be combined and for some of the stages to be embodied by a single pressure intensifier and further stages embodied by a plurality of different pressure intensifiers.

The pressure storage device can be in the form of a bladder storage device. The bladder storage device can comprise a bladder which is filled, for example, with a compressible gas (for example molecular nitrogen), which is arranged in a pressure vessel. When filling the pressure vessel with hydraulic fluid under pressure, the bladder is compressed and the hydraulic energy is stored in the stressed compressible gas.

It is possible to provide four pull rods which preferably pass through the mold mounting plates.

There can also be four first hydraulic cylinders which are respectively associated with a pull rod and which are preferably arranged at a side of a mold mounting plate which is fixed relative to a machine frame, the side facing away from a mold mounting plate which is moveable relative to the machine frame.

There can also be a central push rod associated with a single first hydraulic cylinder.

BRIEF DESCRIPTION OF THE DRAWINGS

Further advantages and details of the invention will be apparent from the Figures and the associated specific description. In the Figures.

DETAILED DESCRIPTION OF THE INVENTION

Figure 1:
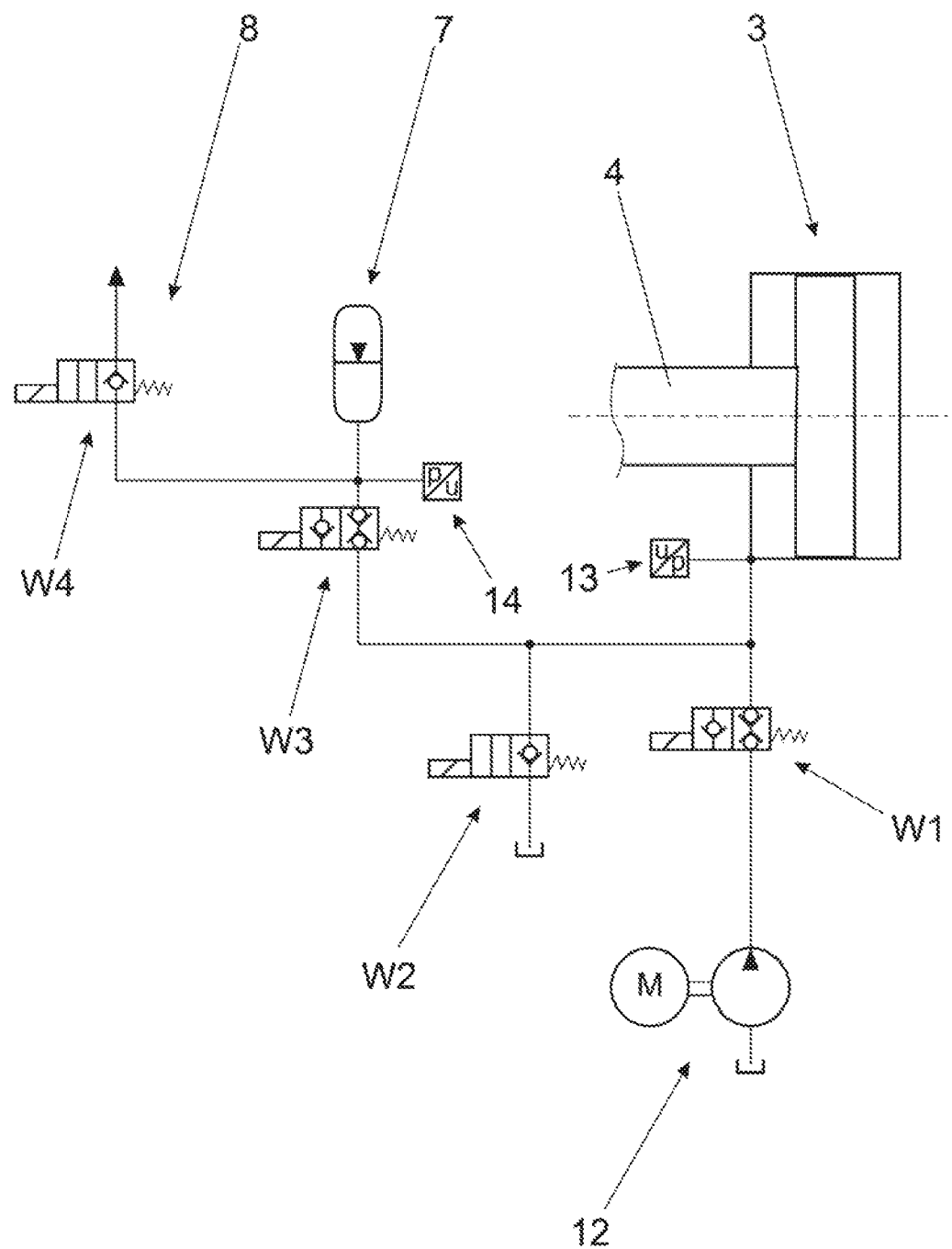
FIG. 1 shows an embodiment of a hydraulic circuit according to the invention of a closing unit.

In accordance with the state of the art at the present time, in a hydraulic injection molding machine or a press, the build-up of closing force is achieved by the compression of hydraulic fluid (=pressure increase) in suitably large hydraulic cylinders (at least one hydraulic cylinder 3). In a structural configuration of injection molding machines from the applicant (DUO-Machines), the hydraulic cylinders are formed of, for example, four large pressure cushion cylinders, and the transmission of force is effected by four pull rods 4 (also referred to as frame bars) and a locking device 5. In this example, there are four locking devices 5—one for each bar (rod) 4—at that mounting plate 2 which is moveable in relation to a machine frame and the other mounting plate 2. The oil volume required for producing the closing force is produced in that case from the short stroke necessary for overcoming the mechanical clearances, the compression volume of the hydraulic fluid, bar extension, and plate flexing of the mold mounting plates 2.

In the reduction in closing force, usually the hydraulic fluid which is under a high pressure is simply discharged to a tank in practice, in which case the stored energy of the compression volume of the fluid, the mechanical extension of the bars, and plate flexing is lost without being used. Now, the aim of the invention is to make it possible to better use that energy again (that is to say, to a higher proportion thereof) than is proposed in the patent literature.

In the first embodiment shown in FIG. 1, for that purpose, the hydraulic circuit in the reduction in closing force is initially of such a form that at any event in the first phase of pressure relief in the reduction of closing force (high-pressure phase) the fluid is not discharged to a tank. Instead, the fluid is discharged to a pressure storage device 7 in the form of a hydraulic accumulator (for example a bladder storage device) loaded therewith up to a certain storage pressure. The residual pressure of the closing force system can then be discharged, for example, to a tank in order to completely shut down the closing force. The pressure storage device which is charged in that way will be further used as a drive source for movements involving a lower need for pressure and amount, more specifically the locking device 5 for example of a pressure cushion machine.

The pressure storage device 7 is prestressed with a comparatively low gas pressure $p_0$ (for example $p_0$=40 bars). With a further pre-charge from a base pressure in the hydraulic system, it is possible to provide a somewhat higher base pressure $p_1$ (for example $p_1$=50 bars) in the pressure storage device 7.

Here follows a brief operational sequence description of the build-up in closing force and reduction in closing force, in accordance with the embodiment shown in FIG. 1.

The first step is the build-up of closing force by the pump 12 and valve W1 in the pressure cushions (first hydraulic cylinder 3) by compression of the oil to, for example, about 250 bars.

In the reduction in closing force now in the first phase, the valve W3 is switched and thus both the compressed oil and that volume of oil which occurs due to the relief stroke involved in bar extensions is fed from the pressure cushions (hydraulic cylinder 3) to the pressure storage device 7.

As the pressure storage device 7 is prestressed with a comparatively low gas pressure, it is now charged to a pressure equalization state as between the pressure cushion chambers and the pressure $p_{Akku}$ in the pressure storage device 7.

Depending on the selected size of the pressure storage device 7, the pressure rise in the accumulator in the present embodiment is at about 10 bars. In other words, the compression volume of the pressure cushions by the reduction in pressure from 250 bars to 60 bars together with the stroke of bar stress relief and plate stress relief is now stored in the pressure storage device 7 at around 60 bars.

By way of the pressure sensors 13 (closing force pressure sensor) and 14 ($p_{Akku}$, pressure storage device pressure sensor), the extent to which pressure equalization has occurred can be recognized. Upon approximation of the two pressures (~60 bars) the valves W2 and W3 are switched and the remaining closing pressure reduction can take place to the tank 15.

The stored energy of the pressure storage device 7 is now available by switching of the valve W4 at any time for other movements with a low level of pressure consumption (for example, locking or core pull).

Figure 2:
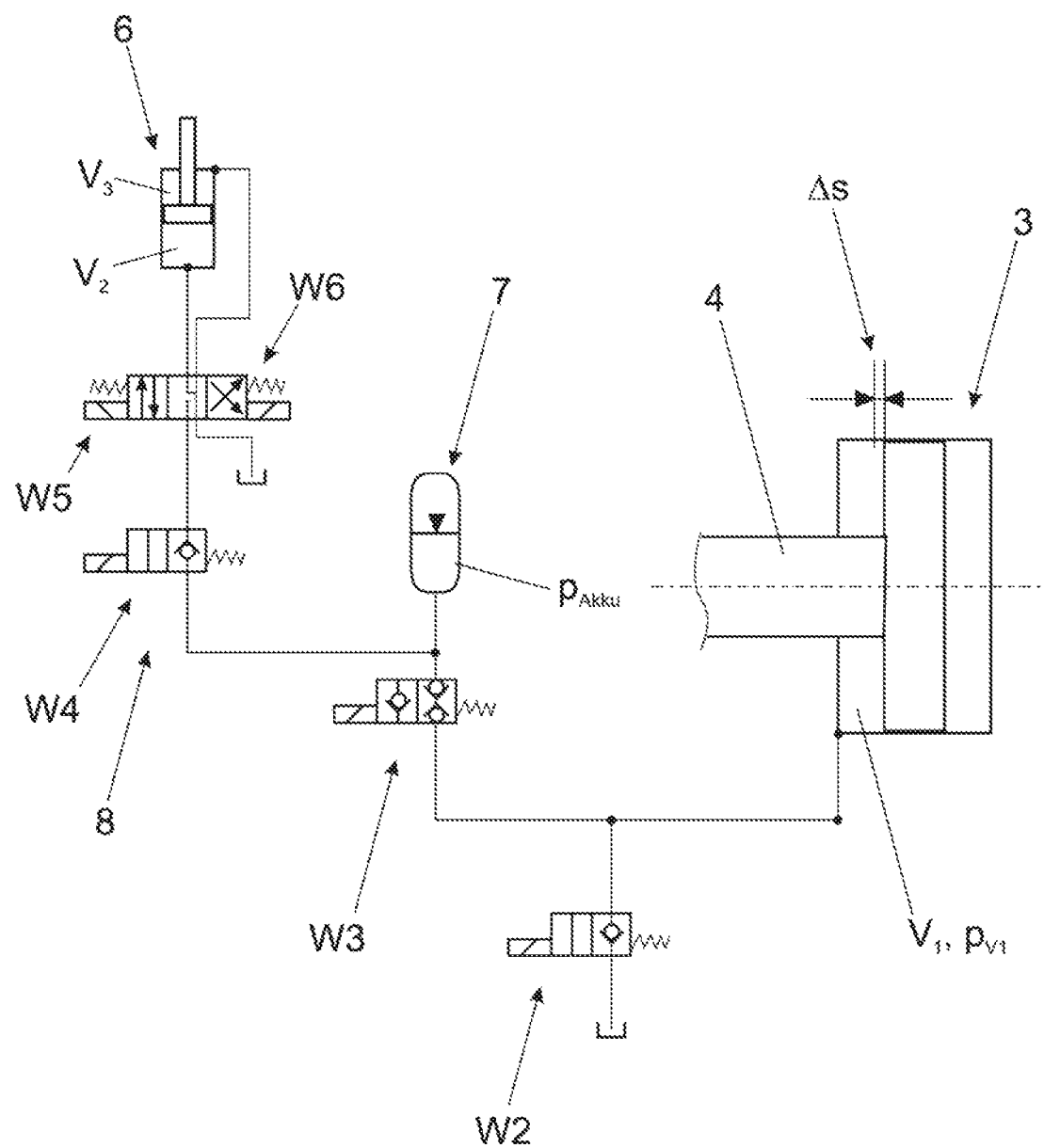
FIG. 2 shows a further embodiment of a hydraulic circuit according to the invention of a closing unit, FIG. 3 are graphs to illustrate the mode of operation of the hydraulic circuit of FIG. 2.

FIG. 2 shows a further example with locking cylinders as consumers, the relevant volumes (V1-V3) and the pressures also being shown.

By reference to FIG. 2, it will now be shown how the volume ratios of the first hydraulic cylinder 3 (pressure cushion cylinder) and the second hydraulic 6 (locking cylinder) can be implemented in order to be able to use the function according to the invention to the best possible degree. In that respect:

$V_1$ denotes oil volume on the rod side pressure cushion cylinder+line volume $V_2$ denotes the maximum piston volume locking cylinder $V_3$ denotes maximum rod volume locking cylinder $V_{As}$ change in volume due to bar extension and plate flexing $_{As}$ denotes bar extension+plate flexing under closing force $_\Delta V_1$ denotes compression volume in the pressure cushion under closing force $_\Delta p_{v1}$ denotes pressure difference between maximum closing pressure and maximum accumulator charging pressure (storage pressure)

K denotes compression module.

The following applies for the compression volume $_\Delta V_1$:

$$\Delta V_1 = V_1 * \Delta p_{v1}/K$$

The total available volume $V_{verf}$ due to the reduction in pressure in the pressure cushions (first hydraulic cylinder 3) is composed of the compression volume $_\Delta V_1$ and the volume change $V_{As}$ due to the restoration of the bar extension and plate flexing:

$$V_{verf} = \Delta V_1 + V_{As}$$

In order to have sufficient stored hydraulic fluid for a cycle implementation in the pressure storage device 7 (to lock at least once and unlock once), $V_{verf}$ must be somewhat greater than the overall possible oil volume of the locking cylinders at the piston and rod side:

$$V_{verf} > V_2 + V_3$$

Figure 3:
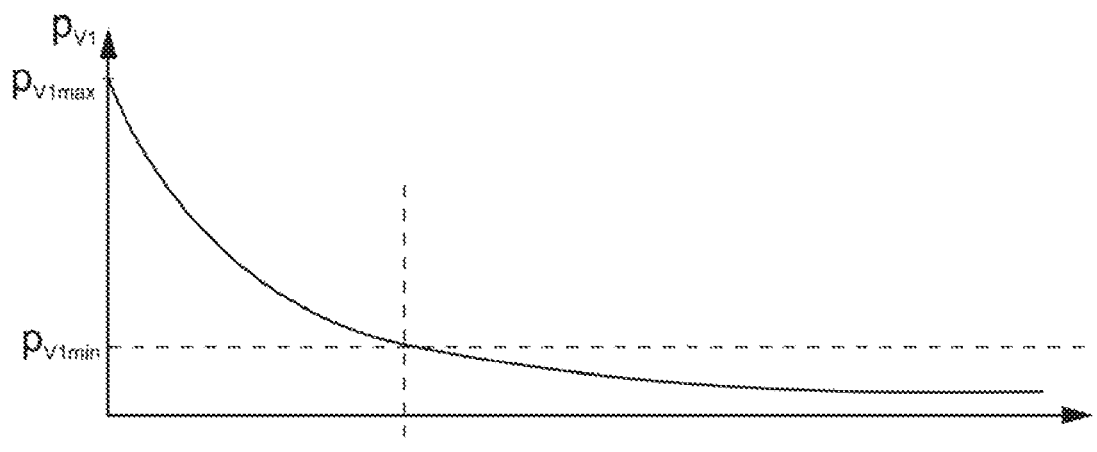
Figure 3:
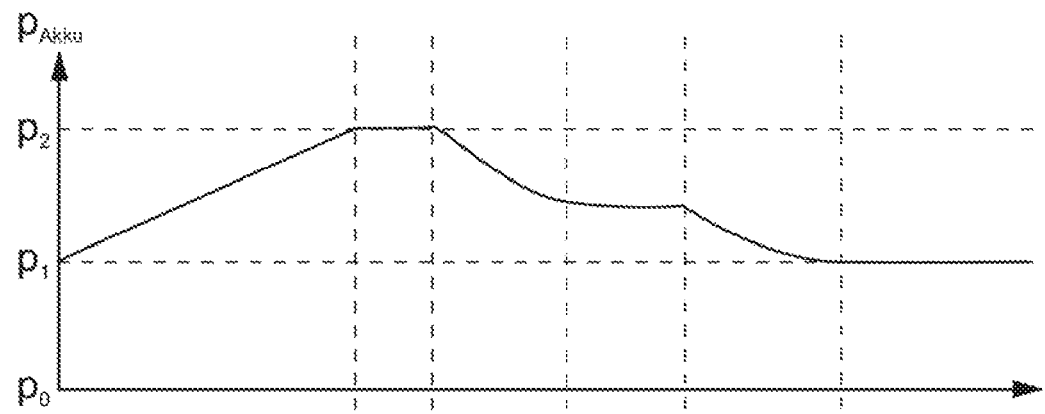
Figure 3:
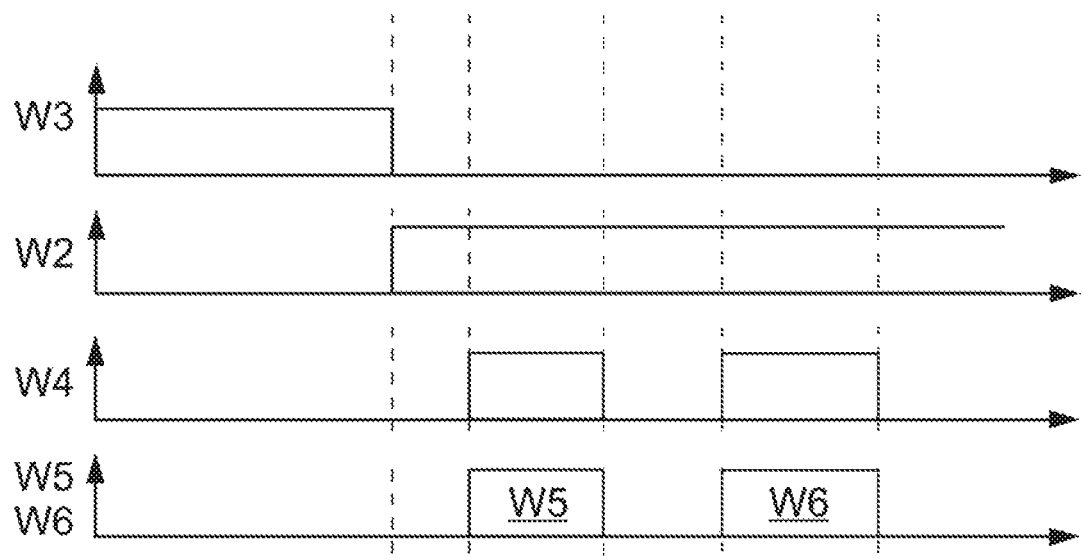

FIG. 3 finally shows an operational diagram involving the configurations of closing pressure in the pressure cushion ($p_{v1}$), accumulator pressure ($p_{Akku}$), and the associated switching positions of the relevant directional control valves W1 through W6 shown in FIG. 2 for a cycle which includes the actions closing force reduction/accumulator charging, unlocking and locking again.

Firstly the pressure $p_{v1}$ in the at least one first hydraulic cylinder 3 under the closing force is at a maximum value $p_{V1max}$. By opening of the valve W3, the pressure in the at least one first hydraulic cylinder 3 is reduced to a value $p_{V1min}$ and the pressure in the pressure storage device 7 rises to a storage pressure $p_2$. At that time, the valve W2 is opened and the valve W3 is closed. As a result, the storage pressure $p_2$ in the pressure storage device 7 is stored and the residual pressure in the first hydraulic cylinder 3 is discharged to the tank. Switching of the valves W5 for unlocking the locking device 5 and W6 for the locking action affords the possibility of opening the closing unit for example by a separate fast stroke, removing a produced mold, and closing the closing unit again, before the closing force can be built up again in the next cycle, after locking has taken place.

In the pressure configuration graphs shown in FIG. 3, it can also be seen that it is precisely at the beginning of the reduction in closing force that there is a very high pressure excess available: about 250 bars in the pressure cushion (first hydraulic cylinder 3) and the minimal pressure in the pressure storage device 7 of about 50 bars. It is only at the close of the reduction in closing force that the pressures approximate (at about 60 bars) when the maximum charging of the pressure storage device 7 is reached.

Admittedly, that simple procedure provides that a part of the stored energy is recovered, but nonetheless there are high losses due to the great pressure difference at the beginning and by virtue of the fact that the last 60 bars cannot be used in this example.

Figure 4:
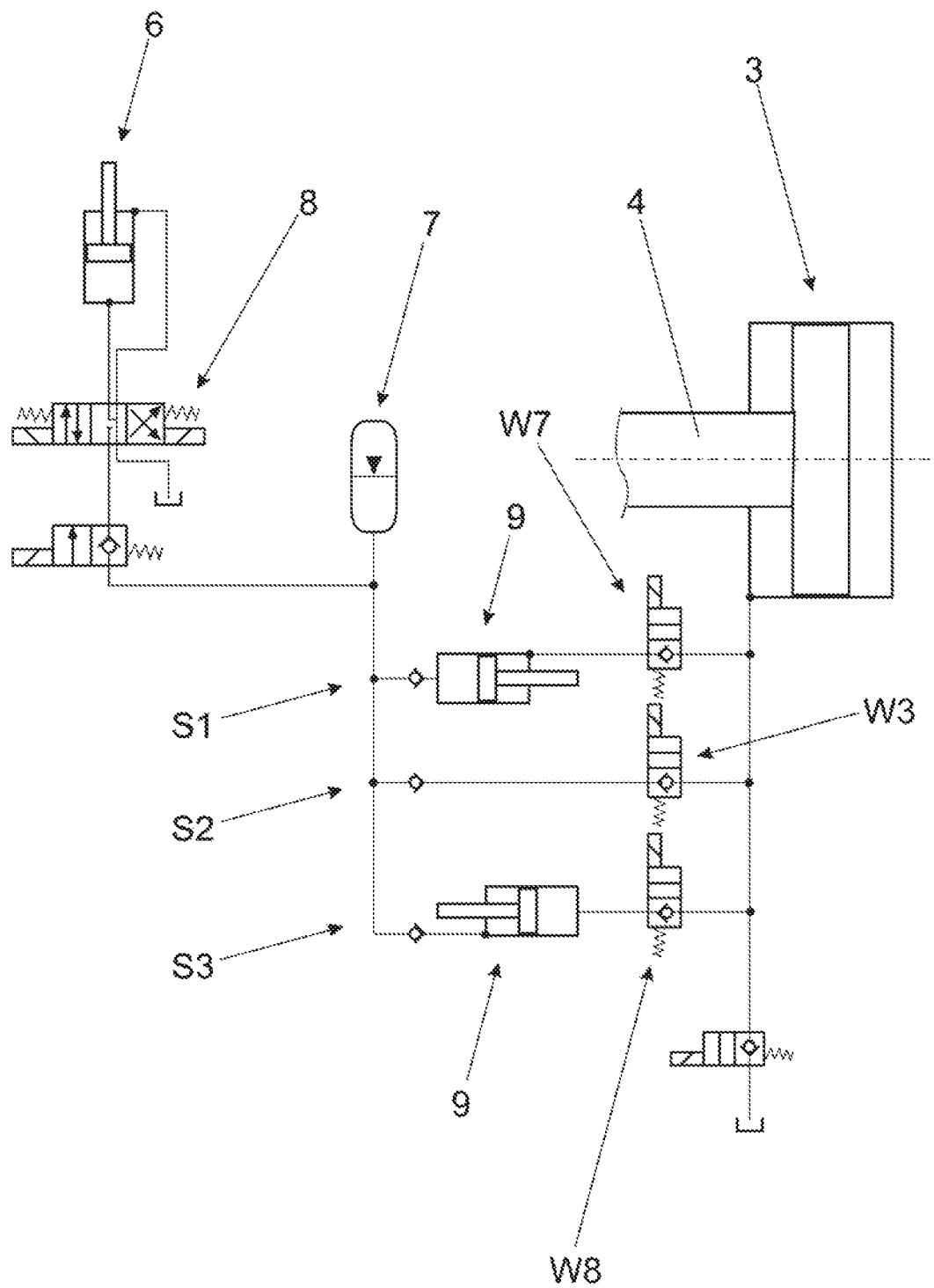
FIG. 4 shows a further embodiment of a hydraulic circuit according to the invention of a closing unit with pressure intensifiers.
Figure 5:
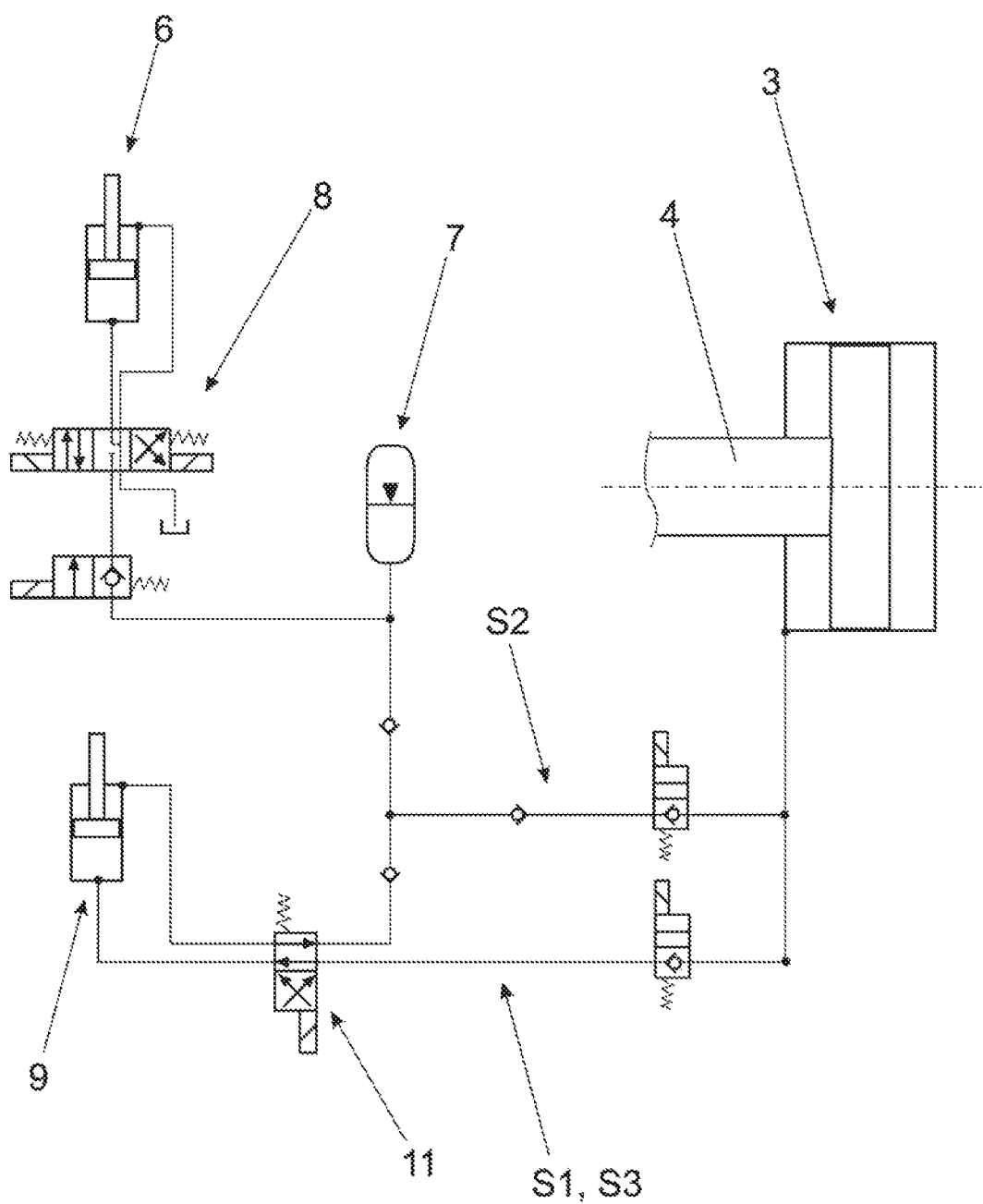
FIG. 5 shows a further embodiment of the hydraulic circuit of a closing unit with a single pressure intensifier.

A further improvement in that respect can be achieved with embodiments as shown in FIGS. 4 and 5. The above-described losses can be markedly reduced by the use of pressure intensifiers (shown in the form of piston-cylinder units 9).

By virtue of the effective area relationships, the pressure intensifiers shown in FIGS. 4 and 5 generate pressure intensifications of 1:2 or pressure reductions of 2:1.

Here follows a brief operational sequence description of the reduction in closing force corresponding to the embodiment of FIG. 4.

A first stage S1, closing force reduction from 250 bars to 125 bars: valve W7 is activated and thus the charged pressure cushion (first hydraulic cylinder) is connected to the rod side of the pressure intensifier 9. That provides a pressure reduction of 2:1, whereby 125 bars are applied on the piston side of the pressure intensifier, that is to say the pressure storage device side. By virtue of the reduction in the pressure loss, at the same time a doubling of the volume of the hydraulic fluid to be stored in the pressure storage device 7 is achieved. Thus in the range of 250 bars to 125 bars, double the volume is charged in the accumulator, than in the structures shown in FIG. 1 or FIG. 2.

Second stage S2, reduction in closing force from 125 bars to 60 bars: valve W3 is now activated and the accumulator is charged directly from the pressure cushion as in the embodiments of FIG. 1 or FIG. 2, until the pressure in the pressure cushion has fallen to 60 bars. The accumulator is selected to be of such a size that in the present embodiment only a pressure rise from 50 bars to about 57 bars was achieved up to that time.

Third stage S3, closing force reduction from 60 bars to 30 bars: valve W8 is now activated and thus a further "reversed" pressure intensifier cylinder 9 with a 1:2 pressure intensification is brought into play. For example, therefore 60 bars in the pressure cushion is increased to 120 bars, thereby permitting further charging of the accumulator to ~60 bars. That can be operated until only about 30 bars prevail in the pressure cushion (first hydraulic cylinder 3).

Fourth stage, closing force reduction of 30 bars: residual discharge of the pressure cushion to the tank is effected by way of the valve W2.

By virtue of that procedure, the charge volume is doubled and the pressure losses reduced in the first stage S1 while in the third stage S3 the usable pressure of the pressure cushion (first hydraulic cylinder 3) is increased from 190 bars (250 minus 60 bars) to 220 bars (250 minus 30 bars). The number or design configuration of the pressure intensifiers, in particular pressure intensification and pressure reduction ratios, can be expanded and refined as desired.

FIG. 5 shows a further simplified variant in which it is possible to use a pressure intensifier 9 by virtue of a change-over switching valve 11 in both directions (first stage S1 and third stage S3). This has the advantage that it saves on a pressure intensifier 9 and in addition, the pressure intensifier 9 after each cycle is automatically in the next starting position again.

Figure 6:
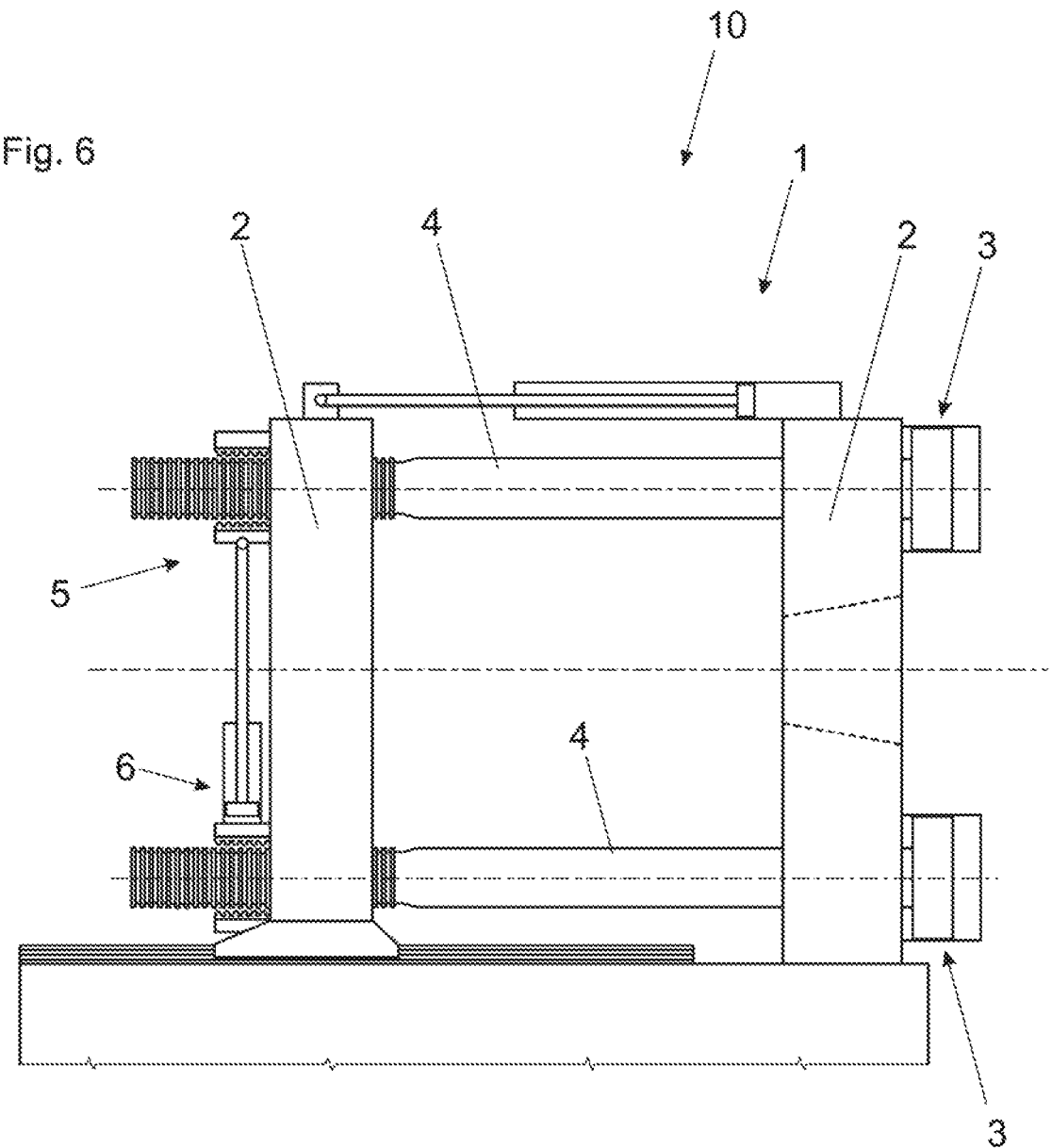
FIG. 6 is a side view of a shaping machine in the region of the closing unit in which the invention can be used.

FIG. 6 shows a side view of a shaping machine 10—in this case an injection molding machine—in the region of the closing unit 1, in which the invention can be used. It is possible to see the mold mounting plates 2, the first hydraulic cylinders 3 for applying the closing force, the pull or push rods 4 (in this case pull rods) as well as the locking device 5 driven by the second hydraulic cylinders 6.

By virtue of the side view, only two portions of the first hydraulic cylinders 3 and the pull rods 4 respectively can be seen in FIG. 6, in which respect there are actually four respective portions. The situation is similar with the two second hydraulic cylinders 6 of the locking device 5, of which only one second hydraulic cylinder 6 is to be seen.

REFERENCE NUMERALS 1 closing unit
2 mold mounting plates
3 at least one first hydraulic cylinder
4 at least one pull or push rod
5 at least one locking device
6 at least one second hydraulic cylinder
7 pressure storage device
8 interconnection
9 pressure intensifier
10 shaping machine
11 switching valve
12 pump
13 closing force pressure sensor
14 pressure storage device pressure sensor
S1-S3 stages
W1-W8 valves

The invention claimed is:

1. A closing unit for a shaping machine comprising:
mutually moveable mold mounting plates configured to carry mold tool portions;
a first hydraulic cylinder configured to apply a closing force to the mold mounting plates;
a locking device configured to lock the mold mounting plates;
a second hydraulic cylinder configured to drive the locking device;
a pressure storage device connected to the first hydraulic cylinder, the pressure storage device being configured to store a pressure prevailing in the first hydraulic cylinder upon pressure relief at a storage pressure, and
a hydraulic interconnection of the pressure storage device with the second hydraulic cylinder such that the storage pressure stored in the pressure storage device is to be used by the second hydraulic cylinder for locking and/or unlocking the locking device.

2. The closing unit as set forth in claim 1, further comprising a pull or push rod for transmission of the closing force from the first hydraulic cylinder to the mold mounting plates and the locking device for locking the pull or push rod relative to one of the mold mounting plates and/or relative to the first hydraulic cylinder, wherein the second hydraulic cylinder is configured to lock and/or unlock the at least one locking device.

3. The closing unit as set forth in claim 2, wherein the storage pressure stored in the pressure storage device is exclusively a pressure source for the second hydraulic cylinder for unlocking and/or locking the molding mounting plates during each locking and unlocking cycle.

4. The closing unit as set forth in claim 2, wherein the pull or push rod is one of four pull rods.

5. The closing unit as set forth in claim 4, wherein the four pull rods pass through the mold mounting plates.

6. The closing unit as set forth in claim 4, wherein the first hydraulic cylinder is one of four first hydraulic cylinders each associated with a respective one of the four pull rods.

7. The closing unit as set forth in claim 6, wherein the four first hydraulic cylinders are arranged at a side of a first one of the mold mounting plates fixed relative to a machine frame, the side of the first one of the mold mounting plates facing away from a second one of the mold mounting plates moveable relative to the machine frame.

8. The closing unit as set forth in claim 2, wherein the pull or push rod is a central push rod associated with the first hydraulic cylinder.

9. The closing unit as set forth in claim 1, further comprising a hydraulically driven core pull member, and the second hydraulic cylinder is further configured to drive the core pull member.

10. The closing unit as set forth in claim 1, further comprising a pressure intensifier connected hydraulically between the first hydraulic cylinder and the pressure storage device.

11. The closing unit as set forth in claim 10, wherein the pressure intensifier is configured to provide a plurality of stages of different pressure intensification and/or pressure reduction.

12. The closing unit as set forth in claim 11, wherein the plurality of stages of different pressure intensification and/or pressure reduction include a pressure-reduced stage, a direct stage, and a pressure-intensified stage.

13. The closing unit as set forth in claim 11, wherein the pressure intensifier includes hydraulic circuitry to be selected by a switching valve.

14. The closing unit as set forth in claim 11, wherein the pressure intensifier is one of a plurality of different pressure intensifiers configured to provide the plurality of stages.

15. The closing unit as set forth in claim 1, wherein the pressure storage device comprises a bladder storage device.

16. A shaping machine comprising the closing unit as set forth in claim 1.

\* \* \* \* \*